(12) United States Patent
Kekre et al.

(10) Patent No.: US 7,158,991 B2
(45) Date of Patent: Jan. 2, 2007

(54) SYSTEM AND METHOD FOR MAINTAINING TEMPORAL DATA IN DATA STORAGE

(75) Inventors: Anand A. Kekre, Pune (IN); Ankur Panchbudhe, Pune (IN)

(73) Assignee: Veritas Operating Corporation, Mountain View, CA (US)

( * ) Notice: Subject to any disclaimer, the term of this patent is extended or adjusted under 35 U.S.C. 154(b) by 480 days.

(21) Appl. No.: 10/675,188

(22) Filed: Sep. 30, 2003

(65) Prior Publication Data

US 2005/0071379 A1 Mar. 31, 2005

(51) Int. Cl.
G06F 17/30 (2006.01)

(52) U.S. Cl. .................................................... 707/102

(58) Field of Classification Search .............. 707/1–10, 707/100–104.1, 200–206; 711/136; 386/98
See application file for complete search history.

(56) References Cited

U.S. PATENT DOCUMENTS

| | | | |
|---|---|---|---|
| 6,823,428 B1 * | 11/2004 | Rodriguez et al. | 711/136 |
| 2002/0186961 A1 * | 12/2002 | Kikuchi et al. | 386/98 |
| 2003/0182301 A1 | 9/2003 | Patterson et al. | |

OTHER PUBLICATIONS

"Press Releases-XOsoft Unveils New Data Rewinder™ for Instantaneous Recovery from Data Corruption," http//:webarchive.org/web/20030805163145/http//www.xosoft.com/press/PressReleases/, Jun. 23, 2003, ( 2 pages).
"RealTime™—Vyant Technologies data recovery in Minutes," Vyant Technologies-Version 14, 2002, (6 pages).
Mario Apicella, "Next-Generation Data Protection," InfoWorld, http//:www.infoworld.com/article/03/05/23/21Tcdiskbacks.1.html, May 23, 2003 (4 pages).
Deni Connor, "Storage Start-Ups Spur Rapid Recovery," NetworkWorldFusion, http//:www.nwfusion.com/cgi-bin/mailto/x.cgi, May 26, 2003, (3 pages).
Robert Fisco, "System Rollback," PCMAG.COM, Jun. 17, 2003, (3 pages).
Neil J. Rubenking, "Recue the Files you Need; Wipe Out Those You Don't," PCMAG>COM, Jan. 2, 2001, (3 pages).
Maiocchi et al., "Temporal Data Management Systems: A Comparative View," IEEE Transactions of Knowledge and Data Engineering, vol. 3, No. 4, Dec. 1991, (pp. 504-524).

(Continued)

*Primary Examiner*—Diane D. Mizrahi
(74) *Attorney, Agent, or Firm*—Robert C. Kowert; Meyertons, Hood, Kivlin, Kowert & Goetzel, P.C.

(57) ABSTRACT

System and method for maintaining temporal data in data storage at the logical device level. Embodiments of the temporal volume manager may provide an interface that allows applications and/or application agents to communicate with the temporal volume manager to manage and keep track of the temporal information on one or more temporal volumes. Embodiments may provide an infrastructure for applications that work on the history of data such as temporal databases, versioning file-systems/repositories, data archives, and streaming media to manage temporal data. In one embodiment, if an application does not want to use the temporal volume directly, application agents may be used to access the temporal volume. Embodiments may provide I/O controlled, application-controlled, and/or periodic checkpointing of temporal data on the temporal volume. One embodiment may provide a mechanism for generating temporal images (e.g. point-in-time and slice-in-time images) of a temporal volume that may have their own independent history.

34 Claims, 9 Drawing Sheets

OTHER PUBLICATIONS

Chen et al., "Design and Implementation of Temporal Extension of SQL," Proceedings of the 19th International Conference on Data Engineering (ICDE'03), Mar. 2003, (pp. 689-691).

Özsoyoğlu et al., "Temporal and Real-Time Databases: A Survey," IEEE Transactions of Knowledge and Data Engineering, vol. 7, No. 4, Aug. 1995, (pp. 513-532).

Alex Miroshnichenko, "Data Management API: The Standard and Implementation Experiences," http://www.csu.edu.au/special/auugwww96/proceedings/alex/alex.html, 1996 (12 pages).

Jensen et al., "Temporal Data Management," IEEE Transactions of Knowledge and Data Engineering, vol. 11, No. 1, Jan./Feb. 1999, (pp. 36-44).

Toigo Partners International LLC: "Introducing Time Addressable Storage: a common-sense approach to data protection," Business Technology Brief, May 28, 2003, (14 pages).

Jensen et al., "Temporal Data Management," IEEE Transactions on Knowledge and Data Engineering, vol. 11, No. 1 Jan. 1, 1999, (pp. 36-44).

PCT Application No. PCT/US04/032490, International Search Report dated Aug. 17, 2005, (11 pages).

* cited by examiner

SYSTEM AND METHOD FOR MAINTAINING TEMPORAL DATA IN DATA STORAGE

BACKGROUND OF THE INVENTION

1. Field of the Invention

This invention is related to the field of computer systems and, more particularly, to data storage systems.

2. Description of the Related Art

In a typical prior art data volume, whenever the data changes, the corresponding blocks are changed in situ. This is adequate as far as today's applications like relational databases and file systems are concerned. However, conventional data volume management techniques do not lend themselves to maintaining and processing temporal or time-varying information. Applications such as data mining, data warehousing, media libraries, medical records, etc. may need to maintain and/or process temporal or time-varying information. There is no single infrastructure in the prior art that can allow the applications in these fields to manage temporal data. Due to lack of an infrastructure in storage, prior art applications typically use brute force methods that tend to be inefficient to support the temporal paradigm. Therefore, it is desirable to provide a logical device-level infrastructure for generically managing temporal data across a variety of applications.

SUMMARY

Embodiments of a system and method for maintaining temporal data in data storage at the logical device level are described. Embodiments may provide a generic mechanism for timestamping data at the logical device (volume) level to provide content preservation. Embodiments may provide a mechanism for managing and accessing temporal volumes. Some embodiments may be integrated with a volume manager. The mechanism for managing and accessing temporal volumes may be referred to as the temporal volume manager. Embodiments of the temporal volume manager may provide an interface that allows applications and/or application agents to communicate with the temporal volume manager to manage and keep track of the temporal information on one or more temporal volumes. Embodiments may provide an infrastructure for applications that work on the history of data such as temporal databases, versioning file-systems/repositories, data archives, and streaming media to manage temporal data.

A temporal volume may be a volume that maintains non-present data in addition to the present data. A temporal volume may maintain the history of data stored on it, thus providing a way for the application to retrieve a copy of the data at any time in the past. In a temporal volume, whenever a block of data is to be changed, the existing block is first preserved, and then the new data is overwritten. The old versions of a block are maintained even when the block is deleted by the application from the data. This achieves the effect of maintaining copies of one or more states of the data in the past. Temporal volumes may be used, for example, in host-based, network-based (switch or appliance), and array storage environments. Further, note that temporal volumes may be used in in-band as well as out-of-band virtualization.

In one embodiment, if an application does not want to use the temporal volume directly (as a device), application agents (described below) may be used to help them make use of the volume's temporal features. This removes the burden of temporal data management from the applications so that they can concentrate on how to consume the data rather than how to store it.

In embodiments, the history of data in a temporal volume may be maintained in several ways including, but not limited to: I/O controlled checkpointing, application-controlled checkpointing, and periodic checkpointing. In I/O controlled checkpointing, the application using the temporal volume may provide timestamps when writing to and/or reading from the temporal volume. As an alternative to providing a timestamp with every write, an application may issue an I/O request or command, such as an IOCTL (I/O control command) in UNIX environments, which specifies a timestamp for a region (or the whole volume) when required or desired. This method may be referred to as application-controlled checkpointing. Another alternative is for the temporal volume manager to do automatic checkpointing periodically, e.g. every 10 seconds or every 10 minutes. This may be referred to as periodic checkpointing.

A temporal volume has time as a dimension. In one embodiment, the temporal volume manager may provide an interface that allows the user to traverse the time dimension (history) within a temporal volume. One embodiment may provide a mechanism for generating temporal images of a temporal volume that have their own independent history. One embodiment may provide a mechanism for generating slice-in-time images of temporal volumes between two timestamps. One embodiment may provide a mechanism for generating point-in-time temporal images of temporal volumes. A point-in-time image is an image of a volume at a single time, and may be considered a one-dimensional image of a temporal volume. Both slice-in-time and point-in-time images may be used as bases for a temporal image.

BRIEF DESCRIPTION OF THE DRAWINGS

The following detailed description makes reference to the accompanying drawings, which are now briefly described.

Figure 1:
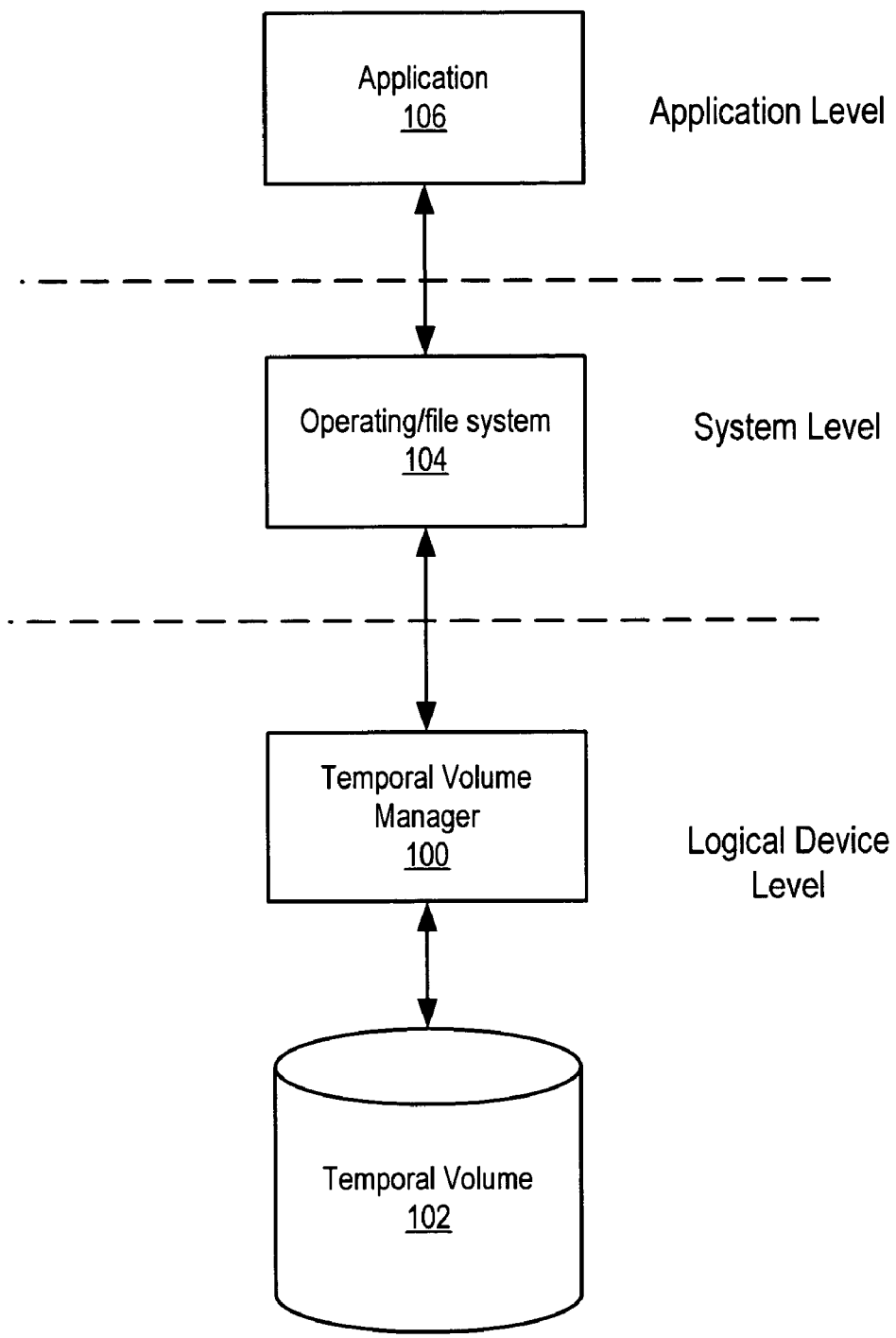
FIG. 1 illustrates a temporal volume manager that manages temporal operations in a temporal volume according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a system and method for maintaining temporal data in data storage at the logical device level are described. Embodiments may provide a generic mechanism for timestamping data at the logical device (volume) level to provide content preservation. In embodiments, a temporal data volume, which may also be referred to herein as a temporal volume, may provide interfaces for management, I/O operations, replication, and support for operations including, but not limited to, backup, restore, and Hierarchical Storage Management (HSM). Embodiments may provide a mechanism for managing and accessing temporal volumes. Some embodiments may be integrated with a volume manager such as the Veritas VERITAS Volume Manager. In this document, the mechanism for managing and accessing temporal volumes may be referred to as the temporal volume manager. Embodiments of the temporal volume manager may provide an interface that allows applications to communicate with the temporal volume manager to manage and keep track of the temporal information on one or more temporal volumes.

Note that a glossary is provided at the end of this document that defines several terms used within the document.

Embodiments may provide an infrastructure for applications that work on the history of data including, but not limited to, temporal databases (irrespective of the temporal model they are using), versioning file-systems/repositories, data archives, and streaming media to manage temporal data. Embodiments may also serve as the building block for future applications that require temporal data management.

A temporal volume may be a volume that maintains non-present data in addition to the present data. A temporal volume may maintain the history of data stored on it, thus providing a way for the application to retrieve a copy of the data at any time in the past. In a normal volume, whenever the data changes, the corresponding data blocks are changed in situ. In a temporal volume, whenever a block of data is to be changed, the existing block is first preserved, and then the new data is overwritten. The old versions of a block are maintained even when the block is deleted by the application from the data. This achieves the effect of maintaining copies of one or more states of the data in the past. This process may also be thought of as doing continuous versioning of the data on the volume, and snapshots of the volume whenever it changes. In another embodiment, the new data may be written to a separate location and the meta-data (such as pointers to the data regions) in the temporal volume may be manipulated.

Temporal volumes may be used in storage environments including, but not limited to, host-based, network-based (switch or appliance), and array storage environments. Also, note that temporal volumes may be used in in-band as well as out-of-band virtualization.

FIG. 1 illustrates a temporal volume manager that manages temporal operations in a temporal volume according to one embodiment. Temporal volume manager 100 may manage temporal data operations on temporal volume 102 for an application 106 and/or an operating/file system 104. Application 106 may be any type of application that is interested in maintaining a history of data such as temporal databases, versioning file-systems/repositories, data archives, and streaming media to manage temporal data. Temporal volume manager 100 may provide one or more APIs to application 106 and/or operating/file system 104 for performing various read, write or other operations on the temporal volume 102.

Temporal volumes may be thought of as generic temporal data infrastructures, which any application interested in time dimension can use. In one embodiment, if applications do not want to use the temporal volume directly (as a device), application agents (described below) may be used to help them make use of the volume's temporal features. Application agents remove the burden of temporal data management from the applications so that they can concentrate on how to consume the data rather than how to store it. For example, databases can concentrate on efficient query processing instead of worrying about how to store copies of a table, file systems can concentrate on file operations instead of worrying how to version a file, and repositories can concentrate on faster indexing rather than on archiving data histories.

Figure 2:
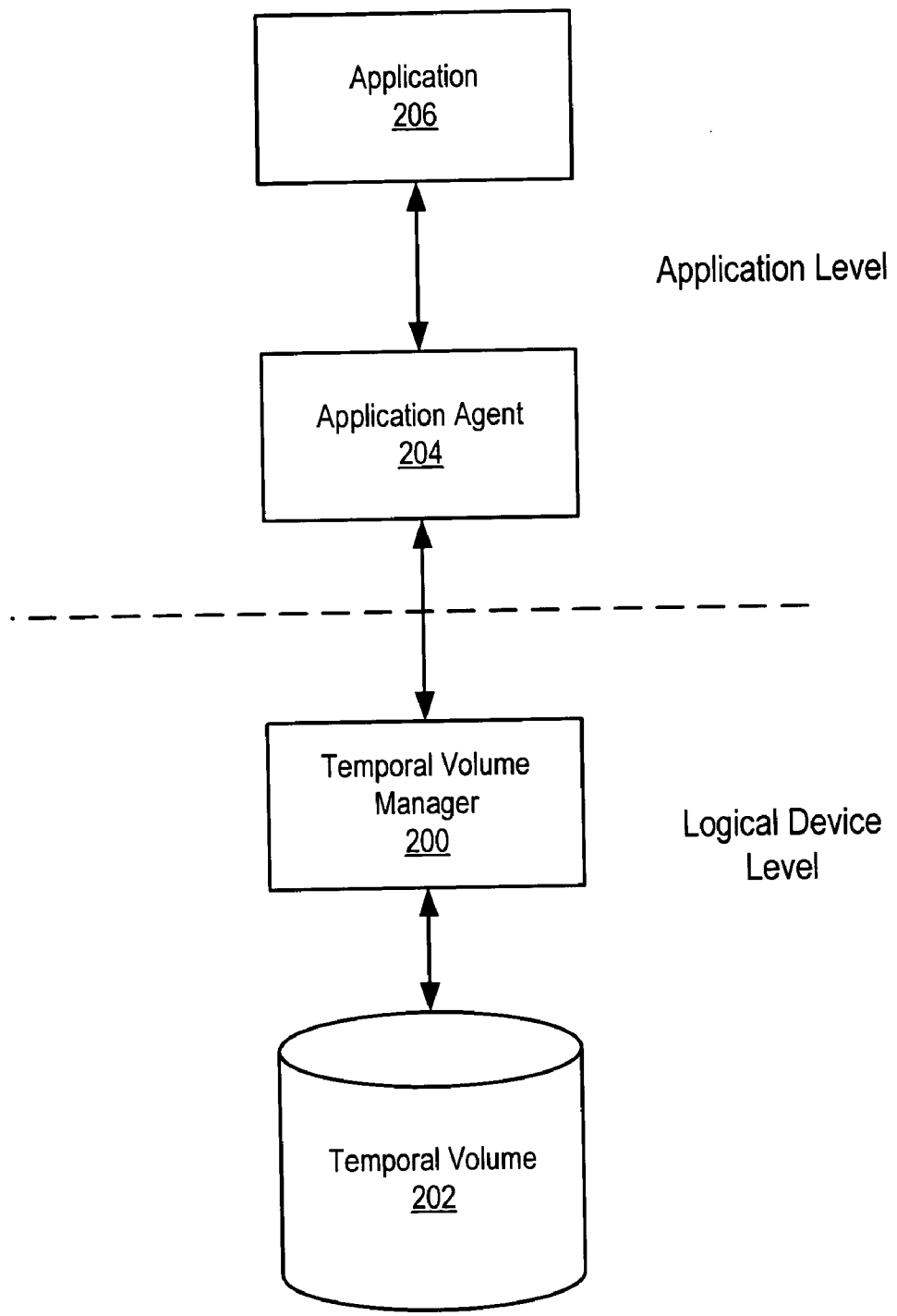
FIG. 2 illustrates an application using an application agent to interface with a temporal volume manager according to one embodiment.

FIG. 2 illustrates an application using an application agent to interface with a temporal volume manager according to one embodiment. Temporal volume manager 200 may manage temporal data operations on temporal volume 202 for an application 206. Application 206 may be any type of application that is interested in maintaining a history of data such as temporal databases, versioning file-systems/repositories, data archives, and streaming media to manage temporal data. Temporal volume manager 200 may provide one or more APIs for performing various read, write or other operations on the temporal volume 202. Application agent 204 is a broker that interacts with temporal manager 200 on behalf of application 206 and that supports (some or all) semantics of the application 206. Application agent 204 preferably makes it easier for application 206 to interact with temporal volume 202. In addition, application agent 204 may allow application 206 to extract data in a needed format and not just as raw data.

Storing the history of data at storage (logical device) level also may make management easier. At the application level, this offloads the effort of managing storage temporally. As an example, databases do not have to make a copy of the branches of their metadata such as B-trees, file systems do not have to maintain copies of their i-nodes, and repositories do not have to replicate their indexes. For the system administrator, this means managing only one temporal source of data rather than managing a different temporal database, a different versioning FS and a different archiving repository.

Temporal volumes provide an infrastructure for maintaining and accessing temporal information. Temporal volumes may be used by applications at all levels, including file systems and databases. In addition, temporal volumes may also be used as building blocks for data archival, versioning, replication, backup and HSM through integration with file system and backup products (e.g. VERRFAS' File System and Net Backup products). Temporal volumes preserve temporal content so that the content may be used at a later point in time for snapshots, incremental backups, replication, restoring corrupted volumes or deleted files.

Temporal volumes may provide virtually unlimited storage capacity to applications by automating the migration/recall of data to/from offline storage using a process such as HSM. Temporal volumes may also be integrated with backup utilities such as VERITAS NetBackup to provide automated backup, including incremental backup. Periodic replication may be provided for temporal volumes using temporal windows and/or periodic checkpointing.

Temporal volumes may be used in applications in areas including one or more of, but not limited to:

Business Intelligence/Data Mining—This is about finding patterns and behaviors out of customer data. Finding such results typically requires temporal data. As examples, using temporal data, retailers can do data mining to find out the usage patterns for their customers and banks can analyze customer data to find out credit histories, frauds, etc.

Data warehouses—Data warehouses are enterprise-wide databases that are generally used to store all of the information about a particular company. Data warehouses are repositories of valuable information gathered by data mining tools and used for knowledge discovery. They also may serve as backends for various enterprises. It is in the data warehouse that the time dimension can be stored and utilized in querying the data, and every data warehouse has a time dimension that makes the data warehouse a temporal database, and is thus suitable for temporal volumes as described herein.

Multimedia and Imaging—Streaming audio/video, images, e-books, and medical data like X-Rays and MRIs, are examples of data that may have some sort of versioning or streaming (time-varying component) associated with it. Media libraries store media files in temporal format and stream them on the basis of factors such as connection speeds, image databases such as satellite imaging and environmental imaging maintain versions of images of the same locations, medical or clinical databases maintain patient histories with X-Rays, body scans etc. These are a few examples of applications that may use time-varying media in some form, and are thus suitable for temporal volumes as described herein.

Fixed content, also referred to as Write-Once-Read-Many (WORM) storage. Using temporal volumes as described herein, it will be possible to trace data on WORM storage to points in the past.

Scientific Computing and Laboratories—Temporal volumes can solve the problem of storage for genetic databases, data analysis, pattern finding, predictions, intense calculations, simple lab tests, data monitoring, signal processing, math, bio-informatics, etc., all of which may have time-varying data.

Data Archival and Auditing—Since temporal volumes preserve history of the data they store, the history may be used for archiving, e.g. by taking the history offline and storing it on tape or other media. The archives may later be used for analysis or auditing. Examples of this include, but are not limited to, old employee databases, old sales data, census data, logs, and server histories. Another example is the regulatory archiving as required by different laws and regulations.

Data Versioning—Document versioning may be implemented on a temporal volume.

In one embodiment, at the temporal volume manager level, the contents of a temporal volume may be preserved using an indexing system or structure (e.g. cache objects, arrays, etc.). A cache object may be defined as an object that projects an illusion of infinite storage to its users while using a limited storage space. A cache object may be used to create space-optimized snapshots by allocating the storage over a cache object. A cache object derives its storage from an underlying volume called the cache volume. The cache volume may be grown whenever needed to keep up with the promise of infinite capacity based on policies.

In one embodiment, the volume may be divided into one or more regions. A region may be anywhere from one physical block of the disk to regions of kilobytes, megabytes, gigabytes, etc. The volumes may be divided into regions, and each region may have a timestamp associated with it. In one embodiment, applications (file systems, databases, etc.) may specify what timestamps are to be associated with the regions. In one embodiment, a timestamp may be specified by the application when data is written to the temporal volume. Note that prior art systems do not allow applications to specify the timestamp on write.

In embodiments, the history of data in a temporal volume may be maintained in several ways including, but not limited to: I/O controlled checkpointing, application-controlled checkpointing, and periodic checkpointing.

In I/O controlled checkpointing, the application using the temporal volume may provide timestamps when writing to and/or reading from the temporal volume. In I/O controlled checkpointing, an application may provide a timestamp to the temporal volume manager with every I/O request or alternatively only with I/O requests that are to do something with the temporal data. In this document, the term I/O request is used to indicate any I/O request, command, I/O control request, IOCTL, or other mechanism used by an application or other entity to interact with a volume, e.g. to read and write data to a volume. In one embodiment, with any I/O request (e.g. read or write), an application may specify that the region being written to is to be timestamped with the provided timestamp. In one embodiment, in I/O controlled checkpointing, the temporal volume manager may provide an I/O request interface that allows applications to issue I/O requests (I/O control commands or requests, such as UNIX IOCTLs) that specify timestamps. In one embodiment, I/O controlled checkpointing may be achieved using temporal read and temporal write interfaces to the temporal volume manager. For example, temporal databases may use I/O controlled checkpointing to specify a timestamp with every write.

Figure 3:
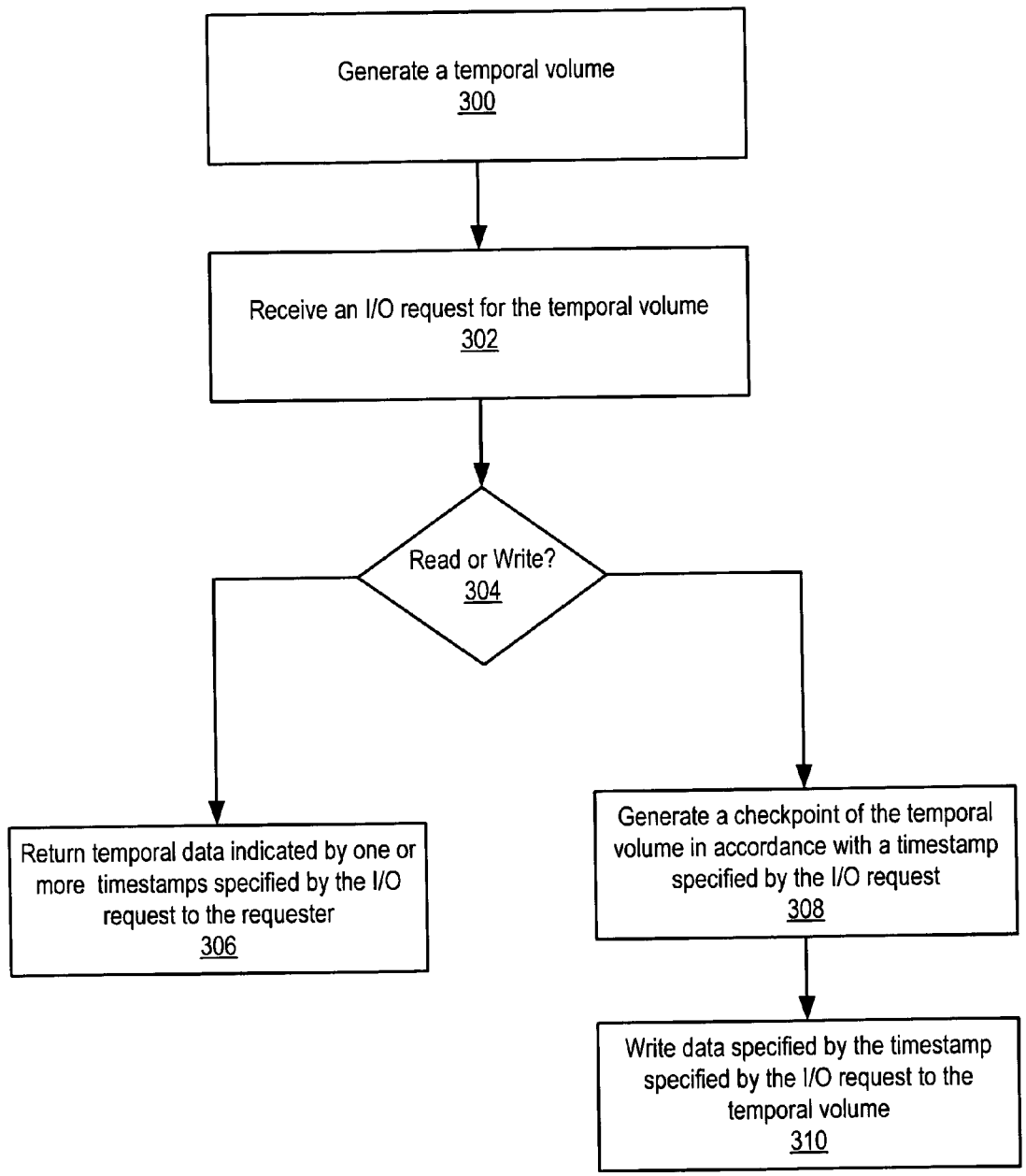
FIG. 3 is a flowchart of a method for managing temporal volumes at the logical device level using I/O controlled checkpointing according to one embodiment.

FIG. 3 is a flowchart of a method for managing temporal volumes at the logical device level using I/O controlled checkpointing according to one embodiment. As indicated at 300, a temporal volume may first be generated to store temporal data for an application. As indicated at 302, the temporal volume manager may receive an I/O request from the application (or an agent of the application, if agents are being used). If the I/O request is a temporal request, then the I/O request may specify one or more timestamps for temporal data on the temporal volume. The temporal volume manager may present an API to the application (or application agent) for use in accessing and requesting temporal operations on the temporal volume. If the I/O request is a temporal read request, the temporal volume manager may return temporal data indicated by one or more timestamps specified by the I/O request to the application as indicated at 306. If the I/O request is a temporal write request, a checkpoint of the region(s) of the temporal volume may be generated in accordance with a timestamp specified by the I/O request as indicated at 308, and the temporal volume manager may write data specified by the I/O request to the temporal volume as indicated at 310.

As an alternative to providing a timestamp with every write, an application may issue an I/O request that specifies a timestamp for a region or the entire volume when required or desired. This method may be referred to as application-controlled checkpointing. In application-controlled checkpointing, an I/O request may be issued that specifies a new checkpoint (point-in-time copy) within the temporal volume, rather than providing a timestamp with every write. In application-controlled checkpointing, the application tells the temporal volume when to create a checkpoint/version (a point-in-time copy of the temporal volume). In one embodiment, this may be done using an I/O request such as an I/O control (IOCTL) operation. A region or regions are timestamped with every application-controlled I/O request. In one embodiment, application-controlled checkpointing may be done atomically across more than one temporal volume.

Figure 4:
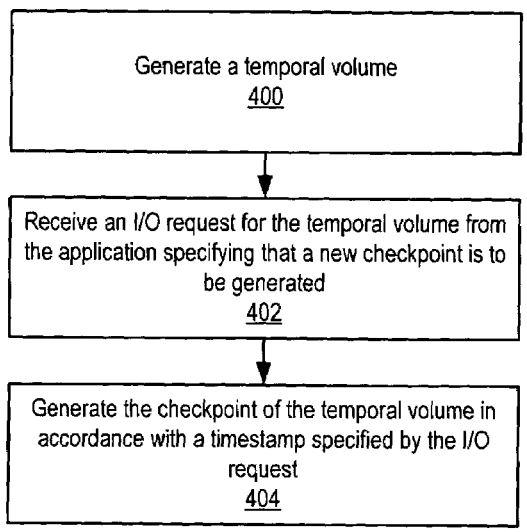
FIG. 4 is a flowchart of a method for managing temporal volumes at the logical device level using application-controlled checkpointing according to one embodiment.

FIG. 4 is a flowchart of a method for managing temporal volumes at the logical device level using application-controlled checkpointing according to one embodiment. As indicated at 400, a temporal volume may first be generated to store temporal data for an application. The application may then make one or more "standard" reads and/or writes to the temporal volume that may not specify a timestamp, and thus do not generate a checkpoint of the temporal volume. As indicated at 402, the temporal volume manager may receive an I/O request for the temporal volume from the application specifying that a new checkpoint is to be generated. The temporal volume manager may then generate the checkpoint of the temporal volume in accordance with a timestamp specified by the I/O request as indicated at 404.

Another method is to do automatic checkpointing periodically, e.g. every 10 seconds or every 10 minutes. This may be referred to as periodic checkpointing. In periodic checkpointing, the temporal volume manager may provide an interface that allows the configuration of periodic checkpointing by the temporal volume manager at the logical device (volume) level. In periodic checkpointing, the temporal volume infrastructure (e.g., temporal volume manager) creates a new checkpoint of the data periodically. This preferably saves storage space that may have been wasted by storing each change to data. Note that, in the prior art, every write is typically saved.

Figure 5:
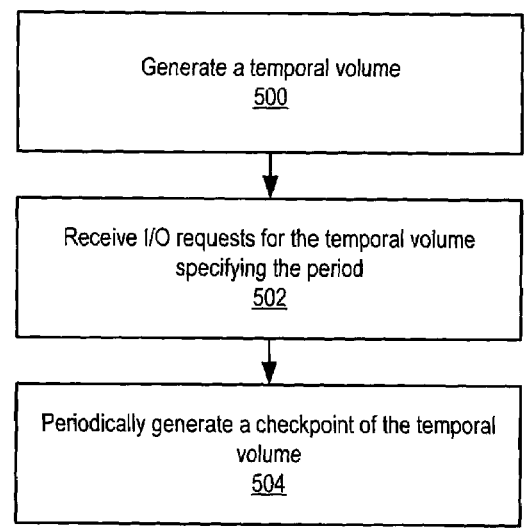
FIG. 5 is a flowchart of a method for managing temporal volumes at the logical device level using periodic checkpointing according to one embodiment.

FIG. 5 is a flowchart of a method for managing temporal volumes at the logical device level using periodic checkpointing according to one embodiment. As indicated at 500, a temporal volume may first be generated to store temporal data for an application. As indicated at 502, the temporal volume manager may then receive I/O requests from the application that may not specify a timestamp, and thus do not generate a checkpoint of the temporal volume. In one embodiment, an I/O request may specify the time interval (or period) at which the checkpoint should be taken. As indicated at 504, the temporal volume manager may periodically generate a checkpoint of the temporal volume (e.g. every n minutes, hours or days). Note that, in one embodiment, the temporal volume manager may receive I/O requests from the application that specify a timestamp and specify that a checkpoint is to be generated when periodic checkpointing is being used.

If an application is using the temporal write interface, the application may specify a timestamp along with the write data, and the volume manager performs a temporal write. In one embodiment, the timestamp applies to the specific write; other data being stored on the volume may or may not have temporal information stored with it. In other words, in one embodiment, some data on a volume may be temporal, and other data on the volume may not be temporal. If data is not temporal, it is not timestamped. In one embodiment, data will only be timestamped if an application issues an I/O request to timestamp the data, or if periodic checkpointing is performed. This may apply to one or more regions or to the entire volume.

A temporal volume has time as a dimension. In one embodiment, the temporal volume manager may provide an interface that allows the user to traverse the time dimension (history) within a temporal volume. The user may, for example, traverse the time dimension of the temporal volume using the interface to perform one or more operations on the data of the temporal volume at previous points in time of the history of the temporal volume. Examples of such operations may include one or more of, but are not limited to: searching the time dimension for a particular version or value of data on the temporal volume; restoring the temporal volume to a state at a particular point in time in the history of the temporal volume; generating slice-in-time or point-in-time images of the temporal volume; etc. One embodiment may provide a mechanism for generating temporal images of a temporal volume that have their own independent history.

One embodiment may provide a mechanism for generating slice-in-time images of temporal volumes. In one embodiment, the temporal volume manager may provide an interface that allows a user/application to request the contents of a region, e.g. between timestamps T1 and T2 (a slice-in-time image). A slice-in-time image is itself a temporal volume, but its extent is limited initially between timestamps T1 and T2. A slice-in-time image is a slice of a temporal volume between the two timestamps. A slice-in-time image of a temporal volume represents a slice of history of the data on the temporal volume. A slice-in-time image may be viewed as a separate temporal volume that can preserve its own history as well. In one embodiment, reads and writes may be performed on a slice-in-time image. Other operations may be performed on slice-in-time images, e.g. data mining. For example, data may be collected over a period, and a slice-in-time image for a month within the period (e.g. August) may be taken and data mining or other operations may be performed on the slice-in-time image.

Figure 6:
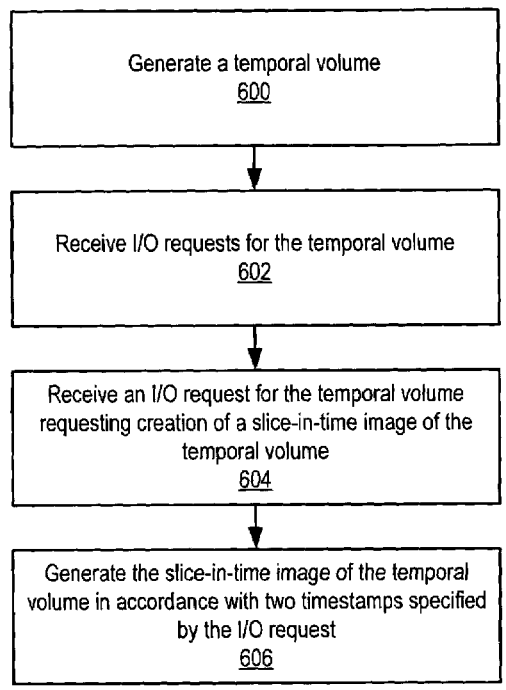
FIG. 6 is a flowchart of a method for generating slice-in-time images of a temporal volume according to one embodiment.

FIG. 6 is a flowchart of a method for generating slice-in-time images of a temporal volume according to one embodiment. As indicated at 600, a temporal volume may first be generated to store temporal data for an application. As indicated at 602, the temporal volume manager may then receive temporal and/or non-temporal I/O requests from the application, at least some of which may generate checkpoints of the temporal volume. Note that, if periodic checkpointing is being used, then the temporal volume manager periodically generated checkpoints within the temporal volume. As indicated at 604, the temporal volume manager may receive an I/O request for the temporal volume from the application requesting creation of a slice-in-time image of the temporal volume. In response to the I/O request, the temporal volume manager may generate the slice-in-time image of the temporal volume in accordance with two timestamps specified by the I/O request as indicated at 606.

One embodiment may provide a mechanism for generating point-in-time temporal images of temporal volumes. A point-in-time image is an image of a volume at a single time, and may be considered a one-dimensional image of a temporal volume. A point-in-time image may be used as a base for a temporal image. A point-in-time image, then, may be considered a temporal volume initialized to the point in time the image is based on. If a timestamp is provided with every I/O (write), there will be a finite number of point-in-time images of the volume. A temporal volume may be thought of as a data volume that includes two or more point-in-time images. Two or more point-in-time images may be combined. A slice-in-time image of a temporal volume may include two or more point-in-time images.

Figure 7:
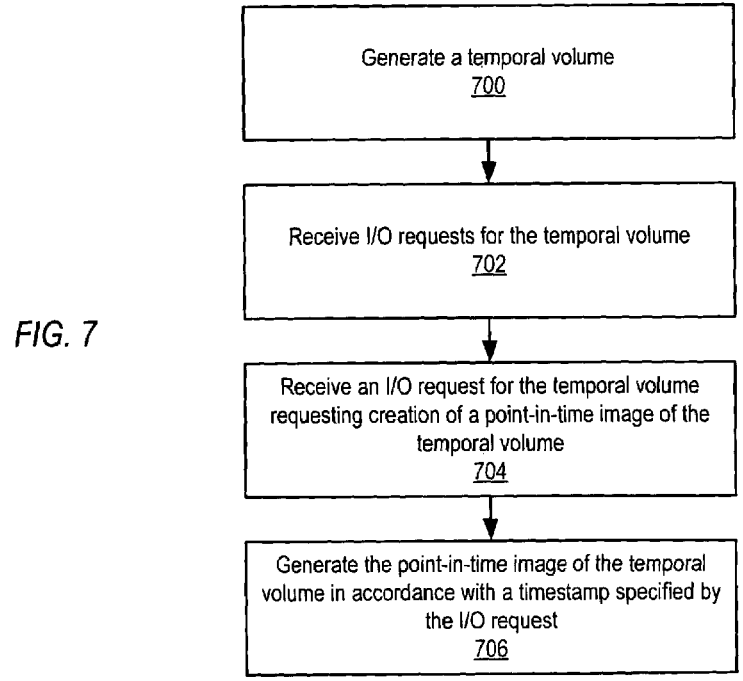
FIG. 7 is a flowchart of a method for generating point-in-time images of a temporal volume according to one embodiment.

FIG. 7 is a flowchart of a method for generating point-in-time images of a temporal volume according to one embodiment. As indicated at 700, a temporal volume may first be generated to store temporal data for an application. As indicated at 702, the temporal volume manager may then receive temporal and/or non-temporal I/O requests from the application, at least some of which may generate checkpoints of the temporal volume. Note that, if periodic checkpointing is being used, then the temporal volume manager periodically generates checkpoints within the temporal volume. As indicated at 704, the temporal volume manager may receive an I/O request for the temporal volume from the application requesting creation of a point-in-time image of the temporal volume. In response to the I/O request, the temporal volume manager may generate the point-in-time image of the temporal volume in accordance with a timestamp specified by the I/O request as indicated at 706.

One embodiment may provide a mechanism for determining the incremental changes between two versions of the data on a temporal volume. Determined incremental changes may be used in applications such as incremental backup, replication etc. In one embodiment, the temporal volume manager may provide an interface for determining what the changes are in a temporal volume between any two points in time. For example, timestamping may be performed over a period of time. A user may want to make a backup or archive the data between two times. An incremental image may be created. An incremental image is a differential image. Incremental images may be used to generate a backup or replication from a time T1 to a time T2 (e.g. from a point in time to a previous backup time). The temporal volume contents may be used to identify the differences. This mechanism preferably makes it easy to implement an incremental backup or replication application or utility; instead of an application or utility having to figure out the changes and manage the snapshots, the temporal volume manager manages the snapshots. The backup or replication application simply requests the temporal volume manager for contents (or the difference or delta in contents) of the temporal volume between times T1 and T2.

In one embodiment, the history of data maintained inside the temporal volume may be truncated, for example using an I/O request such as an IOCTL. Truncation may be required or desired because of space shortage or because the history is no longer needed. In one embodiment, the infrastructure may allow the user of a temporal volume to set a temporal window that determines how much history is maintained. Changes that fall outside the temporal window may be automatically truncated. In one embodiment, the temporal volume manager may provide an interface for truncating the temporal volume to free up space. For example, the interface may allow an application to specify that information is to be kept by the temporal volume for three months. Information older than three months may be deleted by the temporal volume manager. Periodically, e.g. every day or every week data that is older than three months may be deleted.

One embodiment may provide a mechanism for quick restore of a volume from one of its point-in-time images and/or from a slice-in-time image between two particular timestamps. For example, if an application is timestamping its data every 10 minutes, and the volume is somehow corrupted, a restore of the volume may be performed using the temporal data (e.g. to the most recent uncorrupted timestamped temporal data).

Temporal Volumes and Temporal Volume Manager

The following describes exemplary embodiments of a system and method for maintaining temporal data in data storage at the logical device level using a volume manager and cache objects. Note that these embodiments are exemplary and that other mechanisms for enabling temporal volumes may be used. These embodiments provide means for receiving I/O requests for temporal volumes from applications and means for performing logical device-level temporal operation on the temporal volume in response to the I/O requests.

Embodiments may provide a mechanism to create and use temporal volumes, for example using a volume manager, for example VERITAS' Volume Manager (VxVM). One embodiment may use cache objects for archiving history of the data. One embodiment may provide one or more interfaces that allow an application or user of the temporal volume to perform time-based operations in addition to normal volume operations.

Figure 8:
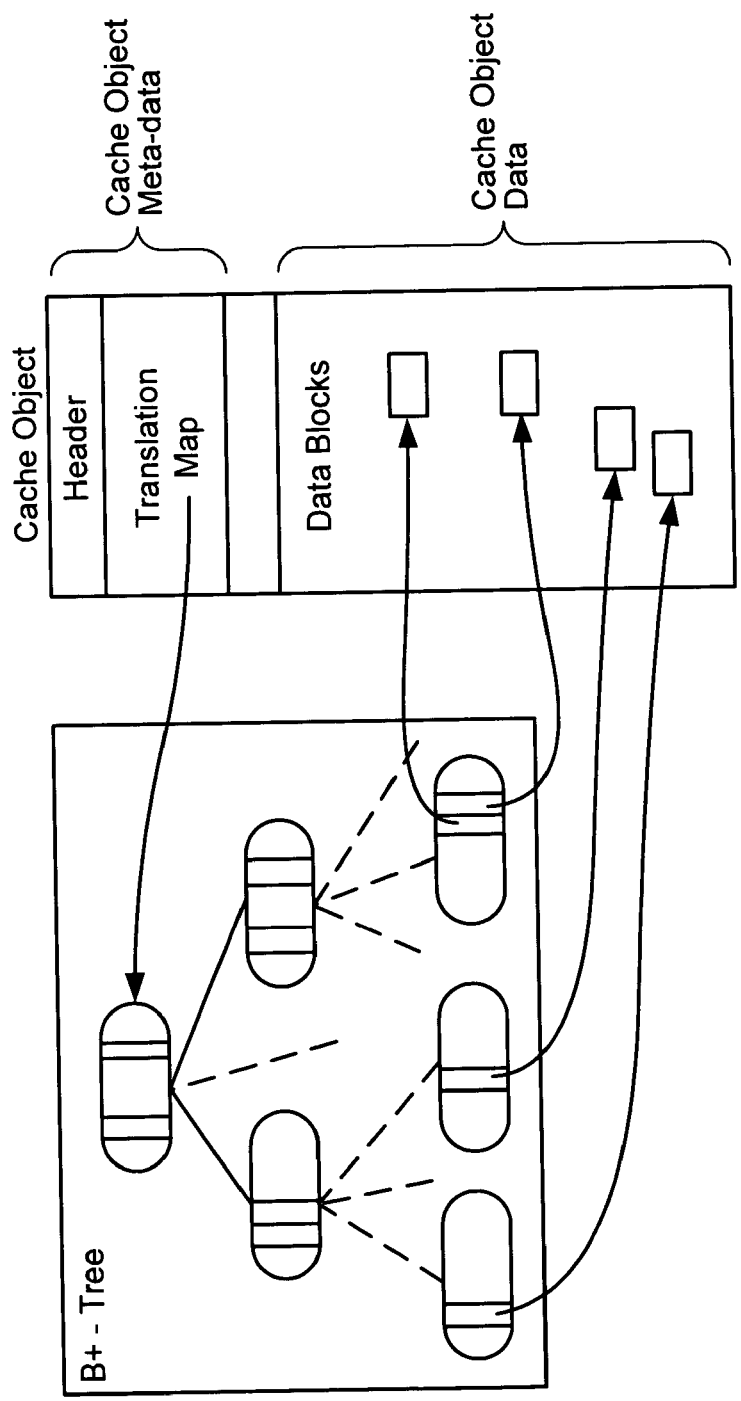
FIG. 8 illustrates an exemplary cache object according to one embodiment.

Within a volume manager, for example VxVM, temporal volumes may be implemented using an indexing system or structure (e.g. cache objects, arrays, B+-tress, etc.). In one embodiment, cache objects may be used to implement temporal volumes. FIG. 8 illustrates an exemplary cache object according to one embodiment. A cache object, as shown in FIG. 8, is an object that projects "infinite" storage to its users while using a limited storage space. A cache object may also be thought of as a space-optimized persistent store. In one embodiment, cache objects may allow users to create space-optimized snapshots. Being created over a cache object, space-optimized snapshots preferably do not use as much storage as their original volume. Actual data is written onto a space-optimized snapshot only when it changes on the original volume (referred to as copy-on-write). Whatever storage space the space-optimized snapshot needs is provided by the underlying cache object. The cache object in turn derives its storage from a cache volume. The cache object maintains the illusion of infinite storage by growing the cache volume when needed, according to some user-defined policies.

In one embodiment, a basic technology that enables space-optimization in the cache object is the re-vectoring of I/O blocks. The cache object achieves this re-vectoring using persistent translation maps. These translation maps may be stored on the same physical store (cache volume) that will store the data written to the space-optimized snapshot on copy-on-write. In addition, the cache object allows multiple space-optimized snapshots to be created on top of it by allowing multiple storage units to be carved out on top of it.

The cache object may allow multiple storage-units to be created on top of it. This means that the cache object may provide multiple virtual addressable ranges for different volumes. Thus, each translation consists of a search key comprising of a storage-unit identifier and a volume offset that maps to the physical offset of the data on the cache volume. According to the size of the search key, the searchable address space may be very large and more so if huge storage space (if not infinite) is provided. This means that the structure that will be used for revectoring or translating onto actual data blocks should be highly searchable and efficient. The B+-Tree is one structure that suits the requirement, and is used in embodiments herein for exemplary purposes, but note that in other embodiments other structures may be used.

In one embodiment, a B+-Tree for a cache object may be stored on the cache volume along with other meta-data such as a super-block, recovery log area, free block list, etc. The area after meta-data is used to store the data regions. Each B+-Tree node in a cache object is of a page size (e.g. determined by the volume manager). The leaf nodes in this tree point to the actual physical data blocks on the cache volume.

In one embodiment, every I/O on the cache object is re-vectored. The re-vectoring may be done using the B+-Tree, and an I/O performs a B+-Tree walk to first locate the physical offset of the data on cache volume. All reads and writes to "valid" regions may need to be re-vectored. Regions are considered "valid" if they are written to one or more times by the application, otherwise they are considered "invalid". In the case of writes to an invalid region of a volume, the cache object may allocate a new entry in the B+-Tree for the new offset; this may be referred to as an allocating write.

Future writes may overwrite the previous contents. In one embodiment, all the writes are treated as independent allocating writes, so that earlier contents are preserved.

Figure 9:
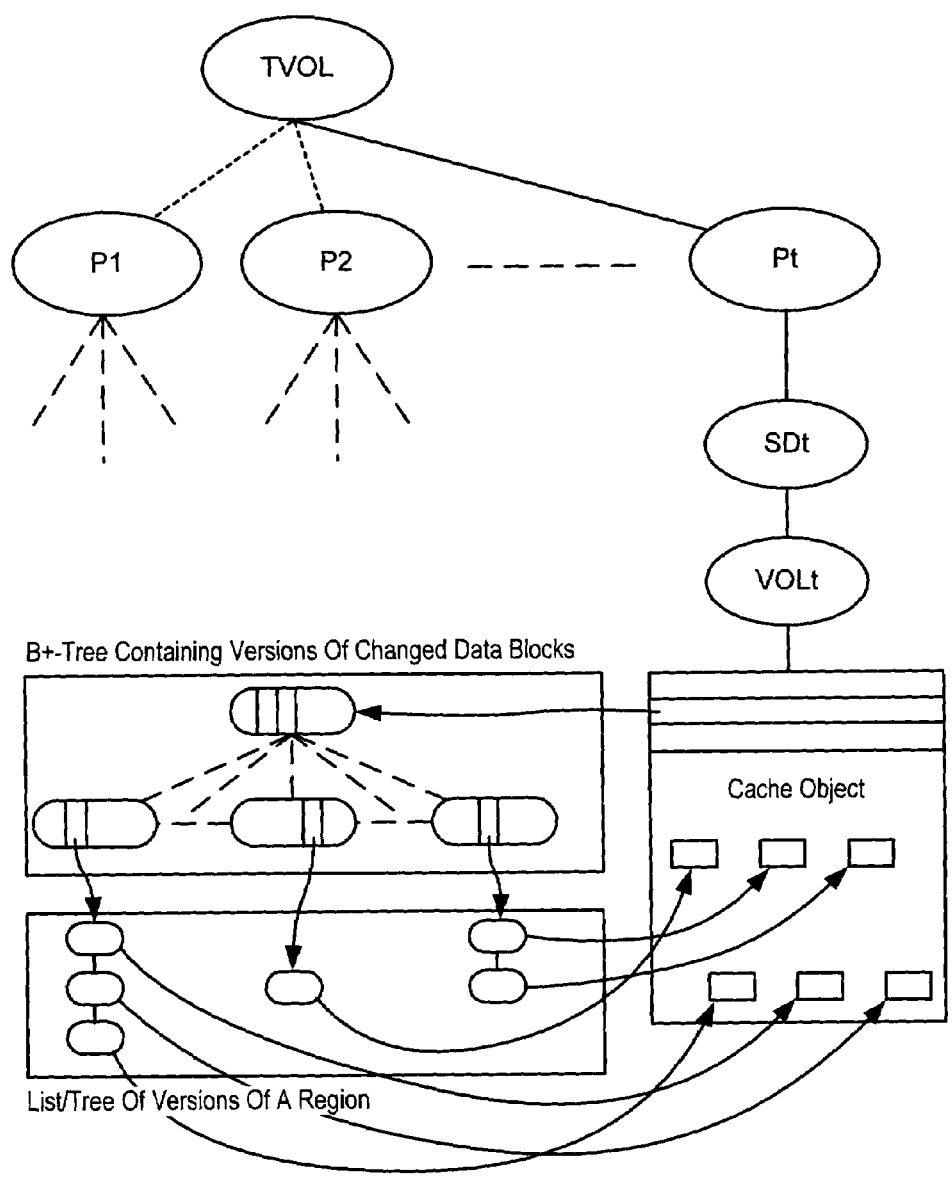
FIG. 9 illustrates the configuration of a temporal volume TVOL according to one embodiment.

FIG. 9 illustrates the configuration of a temporal volume TVOL according to one embodiment. TVOL may have normal data plexes P1, P2 etc. Plexes are defined below in the Glossary. There is also a special plex called Pt that holds the temporal data. Pt has one storage unit, SDt, which may be created over a cache object. This cache object in turn derives its storage from a cache volume. In one embodiment, the cache object may revector writes using B+-Tree as described earlier. In another embodiment, there may only be Pt and no normal data plexes to the temporal volume.

Whenever a change is made to the volume using a normal write, the change may be reflected to all plexes including Pt. While a normal plex like P1 or P2 may just overwrite the existing data with the new one, Pt may instead write over the latest data that is not yet timestamped. If the latest data is already timestamped, the new data may be written at a new location without assigning any timestamp to it.

In one embodiment, for temporal operations, write will go to all the plexes including Pt. The temporal operation will require a timestamp to be specified. In one embodiment, the temporal write may be handled as described in FIG. 10.

Figure 10:
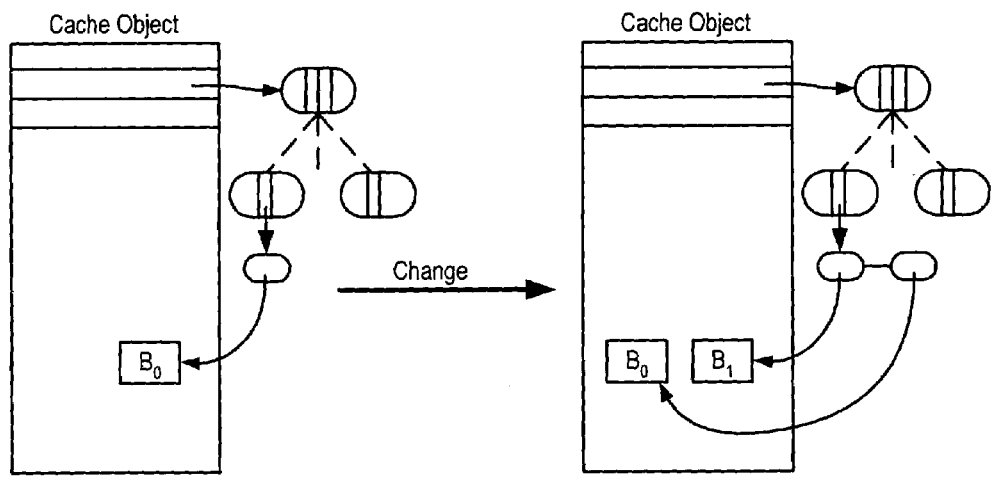
FIG. 10 illustrates handling of the change in a data block on a temporal volume according to one embodiment, and further illustrates the structure below the cache object at a given time.

FIG. 10 illustrates handling of the change in a data block on a temporal volume according to one embodiment, and further illustrates the structure below the cache object at a given time. The cache volume underlying the cache object may include a tree-like structure whose leaves hold pointers to the actual data blocks on the disks. Write to a region B that is not yet in cache object (allocating write) may allocate an entry $B_0$ with a timestamp $T_0$. If the contents of B change, a new region may be allocated on cache volume ($B_1$) rather than overwriting on $B_0$ with a timestamp $T_1$. The cache object may add $B_1$ to a list. $B_1$ contains the most recent copy of the block, while $B_0$ is the previous copy. This chaining may continue as more changes are made to block B. If n changes are made, the blocks may be chained in the order: $B_n \ldots B_2, B_1, B_0$ with the timestamp $T_n$ to $T_0$. This chaining may result in a very long chain. In one embodiment, in such a case, the chain itself may be converted into a tree for faster indexing. In one embodiment, timestamps, as described later, may be maintained with each node in the list of copies to identify the contents.

In one embodiment, as the blocks change, older versions may be chained under the cache object. In effect, the cache object is holding the history of all the data blocks under the volume. In one embodiment, while the latest copies may be found in the normal plexes P1, P2 etc, only older versions may be stored under Pt (refer to FIG. 9). This way, there is a simple delineation between the present data and the historical data. This also allows the new temporal operations to proceed directly on Pt instead of operating on all or a subset of plexes.

In one embodiment, temporal volume may use timestamps to achieve versioning. A normal write on a temporal volume does not achieve temporality. In one embodiment, to keep a history of changing data, the user or the application may use a temporal write interface (further described below). When a normal write is used, the new data simply overwrites the old data. On a temporal write, the new data is chained to the old data and is stamped with the given timestamp. In one embodiment, timestamps may be provided by the application.

In one embodiment, timestamps may be comparable to each other and may be configured so that they may be arranged in temporal order. This may be desired or required for temporal read operations and for getting information about the history of the data. Data types that may be used for timestamps may include, but are not limited to, integer data types. In embodiments, timestamps may be actual system time, version numbers, incremental counters, or any other suitable format. In one embodiment, it may not be required that timestamps are interpretable by the volume manager. The volume manager not having to interpret timestamps may allow the user to have valid time for data, which can be a time in the future. However, the volume manager not having to interpret timestamps may also mean that temporal volumes cannot guarantee the coherence of time as shown by the timestamps. Thus, in one embodiment, it is up to the application or user to maintain coherent timestamps. In one embodiment, users may use the application agent framework described later to offload timestamp maintenance.

In one embodiment, although temporal volumes may maintain "infinite" history (owing to the "infinite" storage offered by cache objects), users may desire to keep only a part or window of history. For example, some application may be interested only in the current and previous version of data, requiring a temporal window of one change/version. Alternatively, some application may want to maintain history of only a period of time, e.g. the most recent n minutes, hours, days, etc., in which case the temporal window is n minutes, hours, days, etc.

In one embodiment, the temporal window may be set during temporal volume creation and may be changed later if desired or required. Any changes to the temporal data outside of the temporal window are not stored and are thus lost. Therefore, if the temporal window is, for example 5 minutes, any changes older than 5 minutes will not be available. In one embodiment, by default, the temporal window is considered "infinite." Increasing the temporal window increases the amount of history, while decreasing it may require the temporal volume to truncate the history.

The uses of temporal window are evident from the examples given above. For a temporal window of 1-change, only the current and last version of the data is maintained. This may be useful, for example, for incremental backup or replication using the difference between the two versions. Since only the difference is being used, the bandwidth usage may preferably be optimized. In the second example, the temporal window is 5 minutes. This may be useful, for example, for periodic incremental backup or periodic replication. If the user wants to incrementally backup data every n minutes, hour, days, etc, a temporal window slightly larger than n may be used and the difference between versions may be used for the incremental backup.

A temporal window of a volume may be represented as a pair of timestamps $<T_a, T_b>$ where $T_a$ is the earliest timestamp and $T_b$ is the latest timestamp. When a temporal volume is created, its temporal window may be undefined until the first temporal write to the volume. On the first write with timestamp $T_x$, a temporal window is initialized to $<T_x, T_x>$. Future temporal writes (e.g. with timestamp $T_i$) change the temporal window to $<T_x, T_i>$. When the history is truncated (described later in detail) from $T_x$ to $T_y$, the temporal window changes to $<T_y, T_i>$.

One embodiment may provide one or more interfaces that allow temporal I/O operations on a temporal volume. In one embodiment, the operations that are allowed on a normal volume may be handled similarly or the same in a temporal volume. In one embodiment, normal (non-temporal) reads on a temporal volume may proceed similarly or the same as they do in a normal volume. If there are no normal plexes (but only temporal plex Pt), the data without any timestamp may be returned. In absence of any data without a timestamp, the data with the latest timestamp may be returned. In one embodiment, a normal write on a temporal volume may proceed similarly or the same as on a normal volume except for creating a dataless space-optimized snapshot (described later in this document). In one embodiment, while normal reads may proceed on a temporal volume just like they do in a normal volume, for retrieving past copies of data one or more I/O requests may be defined.

One embodiment may provide an interface that allows the user to read the contents of an extent at a particular time in the past. In one embodiment, the extent may be specified by an offset on the volume (offset) and its length (length). In one embodiment, the time for which the contents are needed may be specified using a timestamp, and the interpretation of the timestamp may be left to the user. In one embodiment, the timestamp type is preferably a type specified by the volume manager (e.g. VxVM) so that integer comparisons may be performed on it. Examples of timestamps may include, but are not limited to: for databases, timestamps may represent transactional time represented as number of seconds from epoch; for versioning systems timestamps may represent version numbers; for a file system timestamps may be time represented by the system clock; and for some other application timestamps may be an integer counter.

In one embodiment, if a timestamp is 0, the current copy of the data may be returned. This is the equivalent of a normal read. If the timestamp is negative, say −n, then the nth previous copy of the data is returned. This may be useful, for example, for applications that are not interested in actual time but only in the changes or versions.

The following are exemplary APIs that embodiments may provide for various temporal operations on a temporal volume at the device level. Note that these APIs are exemplary, and are not intended to be limiting.

One embodiment may provide an API that may be used to return the contents of an extent as an uninterpreted byte buffer. The volume may be specified using its device number (device). The following is an exemplary format for the API in UNIX environments:

```
void* vol_temporal_read( voldevno_t    device,
                         timestamp_t   timestamp,
                         voff_t        offset,
                         size_t        length );
```

In one embodiment, vol_temporal_read may use an IOCTL (e.g. VOL_TEMPORAL_READ) on the device. VOL_TEMPORAL_READ is an exemplary IOCTL to read the data specified by the [offset, length] pair into the buffer provided by the user. The copy to be read may be specified by the timestamp. VOL_TEMPORAL_READ returns the region(s) that match the specified timestamp (or most recent to the time stamp). The following is an exemplary format for the returned structure:

```
struct vol_temporal_io {
    int           flags;        /* Flags */
    timestamp_t   timestamp;    /* Timestamp */
    caddr_t       buf;          /* Buffer */
    size_t        buf_len;      /* Length of the buffer */
    voff_t        offset;       /* Offset */
}
```

One embodiment may provide an API that may be used to read from a period of time. This interface may allow the user to read all the versions of an extent between two points in time. The extent may be specified using an offset and a length. In this interface, two time stamps may be provided, the first corresponding to the start of the time period and the second corresponding to the end. In one embodiment, both are inclusive. In one embodiment, if the two timestamps (e.g. period_start and period_end) are equal, the copy at period start will be returned. If the two timestamps are both 0, the current copy will be returned. If both timestamps are negative, say −m and −n respectively (m>n), then all copies between the mth previous and nth previous copies will be returned (in one embodiment, both inclusive). The following is an exemplary format for the API:

```
void* vol_temporal_period_read( voldevno_t    device,
                                timestamp_t   period_start,
                                timestamp_t   period_end,
                                voff_t        offset,
                                size_t        length);
```

In one embodiment, vol_temporal_period_read may use an IOCTL (e.g. VOL_TEMPORAL_PERIOD_READ) on the device. The IOCTL returns all copies of the extent [offset, len] between two points in time (a period). The period is specified by using start and end timestamps. Before returning the actual data, this IOCTL may be used to find out the size of the buffer. For this, a null buffer may be submitted, and the IOCTL returns only the number of regions it could find (reg_num). Once the user has found out the number of regions, memory may be allocated in the buffer and the IOCTL may be called again. The user preferably allocates enough memory for the structures (e.g.

period_reg_t) that will describe the layout of copies of the regions within the buffer. The second time, the IOCTL will return two pointers: first is the user buffer itself (buf), which may be filled with copies of the region contents one after another. Each copy may be of different size because blocks may be deleted out of the region. The second pointer (reg_ptr) is to a structure that describes the layout of the regions and their copies within the user buffer. This structure can be thought of a matrix, where each row describes an individual copy of the extent and the columns describe the regions within one copy. The following is an exemplary format for the returned structure vol_temporal_region_period_io:

```
typedef struct period_reg {
    voff_t              vtbr_offset;        /* Region offset */
    timestamp_t         vtbr_timestamp;     /* Copy timestamp */
    struct period_reg   *vtbr_next_region;  /* Next region */
    struct period_reg   *vtbr_prev_region;  /* Previous region */
    struct period_reg   *vtbr_next_copy;    /* Next copy */
    struct period_reg   *vtbr_prev_copy;    /* previous copy */
} *period_reg_t;
struct vol_temporal_region_period_io {
    int                 flags;              /* Flags */
    timestamp_t         start_timestamp;    /* Period start */
    timestamp_t         end_timestamp;      /* Period end */
    caddr_t             buf;                /* Buffer */
    period_reg_t        reg_ptr;            /* Data layout */
    size_t              buf_len;            /* Buffer length */
    caddr_t             reg_num;            /* Number of
                                               register */
    voff_t              offset;             /* Extent offset */
    size_t              len;                /* Extent length */
}
```

In one embodiment, a temporal write is just like a normal write but contains a user-defined timestamp. An exemplary interface for the temporal write is:

```
size_t vol_temporal_write( voldevno_t   device,
                           timestamp_t  timestamp,
                           void         *buffer,
                           voff_t       offset,
                           size_t       length);
```

This volume may be specified using its device number (device) and the data to be written may be provided in the buffer. The time to be written, along with the extent, is provided in the timestamp and is preferably not less than the current timestamp of the extent (if there is any). The extent may be specified as usual using the [offset, length] pair. The kernel IOCTL used for this function (e.g. VOL_TEMPORAL_WRITE) writes to a region on the temporal volume using the given timestamp.

```
struct vol_temporal_region_io {
    int             flags;      /* Flags */
    timestamp_t     timestamp;  /* Timestamp */
    caddr_t         buf;        /* Buffer */
    size_t          buf_len;    /* Length of
                                   the buffer */
    voff_t          offset;     /* Offset */
}
```

The following is an exemplary interface that may be used to truncate the history of a temporal volume (device) preceding the time specified by timestamp:

int vol_temporal_truncate_history (voldevno_t device, timestamp_t timestamp);

The return value is the status indicator. This function in turn uses an IOCTL (e.g. VOL_TEMPORAL_TRUNCATE); this IOCTL truncates the history of the temporal volume. The user may specify the time before which the history should be deleted using a time stamp.

```
struct vol_temporal_truncate {
    int             flags;      /* Flags */
    timestamp_t     timestamp;  /* Timestamp */
}
```

The following is an exemplary interface to change the temporal window:

```
int vol_temporal_change_window ( voldevno_t   device,
                                 timestamp_t  new_window,
                                 twindow_t    window_type);
```

The new temporal window (new_window) may be specified using the timestamp type. Its interpretation depends on what window type is. It may, for example, be time-based, based on the number of changes, or based on the difference between current and oldest timestamp (since timestamps are not be interpreted). This function may use an IOCTL (e.g. VOL_TEMPORAL_CHANGE_WINDOW) to change the temporal window of a temporal volume. If the new window is smaller than the old one, this IOCTL may perform the necessary history truncation activity. The following is an exemplary structure format for the IOCTL:

```
struct vol_temporal_change_window {
    int             flags;      /* Flags */
    timestamp_t     window;     /* New Window */
    twindow_t       type;       /* Window type */
}
```

For pausing the maintenance of changes or versioning inside a temporal volume (device), the following exemplary interfaces may be used:

int vol_temporal_pause_history (voldevno_t device);
    int vol_temporal_resume_history (voldevno_t device);

These two functions return the status of the corresponding operation. They may use kernel IOCTLs (e.g. VOL_TEMPORAL_PAUSE, VOL_TEMPORAL_RESUME); these IOCTLs cause the history keeping to pause and resume respectively. This operation may be useful, for example, for taking the whole history offline for archiving purposes. Any changes made to the volume with the timestamp that fall in the paused interval may be lost while the volume is paused. An alternative is to fail those I/Os.

For getting information about the history of data within a temporal volume, the following exemplary interface can be used:

```
int vol_temporal_info (  voldevno_t   device,
                         voff_t       offset,
                         unsigned int *copy_num,
                         timestamp_t  *min_timestamp,
                         timestamp_t  *max_timestamp,
                         timestamp_t  **change_timestamps,
                         voff_t       **changed_regions);
```

The temporal volume may be specified using its device number (device). If the history is desired for a particular region, it may be specified using its offset. If this offset is negative, the information may be returned for the whole volume. The first piece of information returned is the number of copies of the region (copy_num). The minimum and maximum timestamps on the region are min_timestamp and max_timestamp respectively change_timestamps is a list of all the timestamps on the region. If the information is desired for the whole volume, a list of all changed regions (changed_regions) may be returned. The above interface may use an IOCTL (e.g. VOL_TEMPORAL_INFO) to get information about the history such as the number of copies, timestamps, list of changed blocks and so on. The following is an exemplary structure for VOL_TEMPORAL_INFO:

```
struct vol_temporal_info {
    voff_t   offset;             /* Offset of region */
    caddr_t  copy_num;           /* Number of copies */
    caddr_t  start_timestamp;    /* First modification */
    caddr_t  end_timestamp;      /* Last modification */
    caddr_t  change_timestamps;  /* List of timestamps */
    caddr_t  changed_regions;    /* List of changed region offsets */
}
```

Since a temporal volume keeps all copies of the volume in the past, one embodiment may provide a mechanism for taking full images of the volume at a particular point in time. This image may be a separate volume representing the contents of the volume at that particular instant. This image may be data-full, in which case all blocks are copied onto new storage, or data-less, in which case there is no actual data copy but only some tracking structure pointing to original temporal volume.

Figure 11:
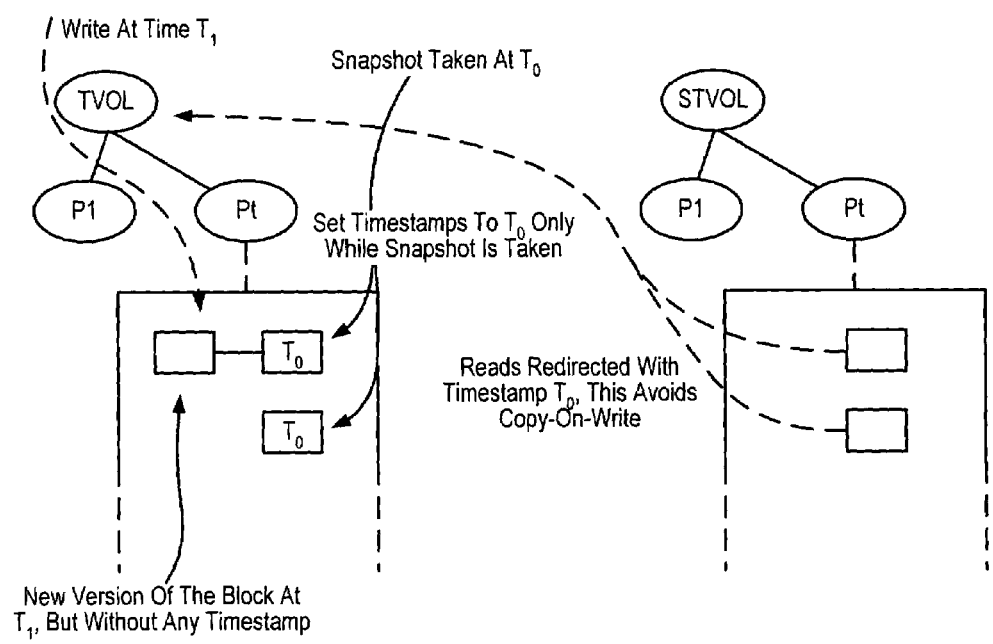
FIG. 11 illustrates a non-temporal snapshot according to one embodiment.

FIG. 11 illustrates a non-temporal snapshot according to one embodiment. The copy-on-write of data that occurs when the data on the original volume of a snapshot is overwritten may be avoided if the original volume is a temporal volume. As shown in FIG. 11, TVOL is a temporal volume on which normal I/O occurs. In a case where there is no temporal application of the temporal volume, no history is maintained under the plex $P_t$ and the regions have no timestamps on them. When a snapshot is taken at $T_0$, all the regions under $P_t$ are marked with timestamp $T_0$, thus avoiding any future writes over these regions. If any new write comes to TVOL, say at $T_1$, it will find the region timestamped with $T_0$ and will not overwrite. Instead, it will be chained with the old data (at $T_0$).

If TVOL were a normal volume, when the write at $T_1$ had happened, it would have pushed the old contents of the region (those at $T_0$) to STVOL (snapshot temporal volume, or temporal snapshot) because of copy-on-write policy. This may be required because STVOL represents the image of TVOL at $T_0$. However, since TVOL is a temporal volume, copy-on-write is not needed. When the write at $T_1$ happens, TVOL may automatically version the region because it had been stamped with $T_0$ and so the contents of the region at $T_0$ are still available under $P_t$. Under normal circumstances, reads will be satisfied from TVOL only if the region is invalid. Hence, in case of STVOL, all regions are initially marked as invalid. Whenever a region is read from STVOL, it is redirected to TVOL, along with a timestamp $T_0$. This will read the contents of the region at $T_0$ and not the current contents (at $T_1$).

If a write happens on STVOL, then the corresponding block is first fetched from TVOL (with timestamp $T_0$) and then written to. The region is then marked as valid since its copy is inside STVOL and it need not be redirected to TVOL. This may be further optimized if the whole region is written to. In such a case, the fetching part may be skipped.

Figure 12:
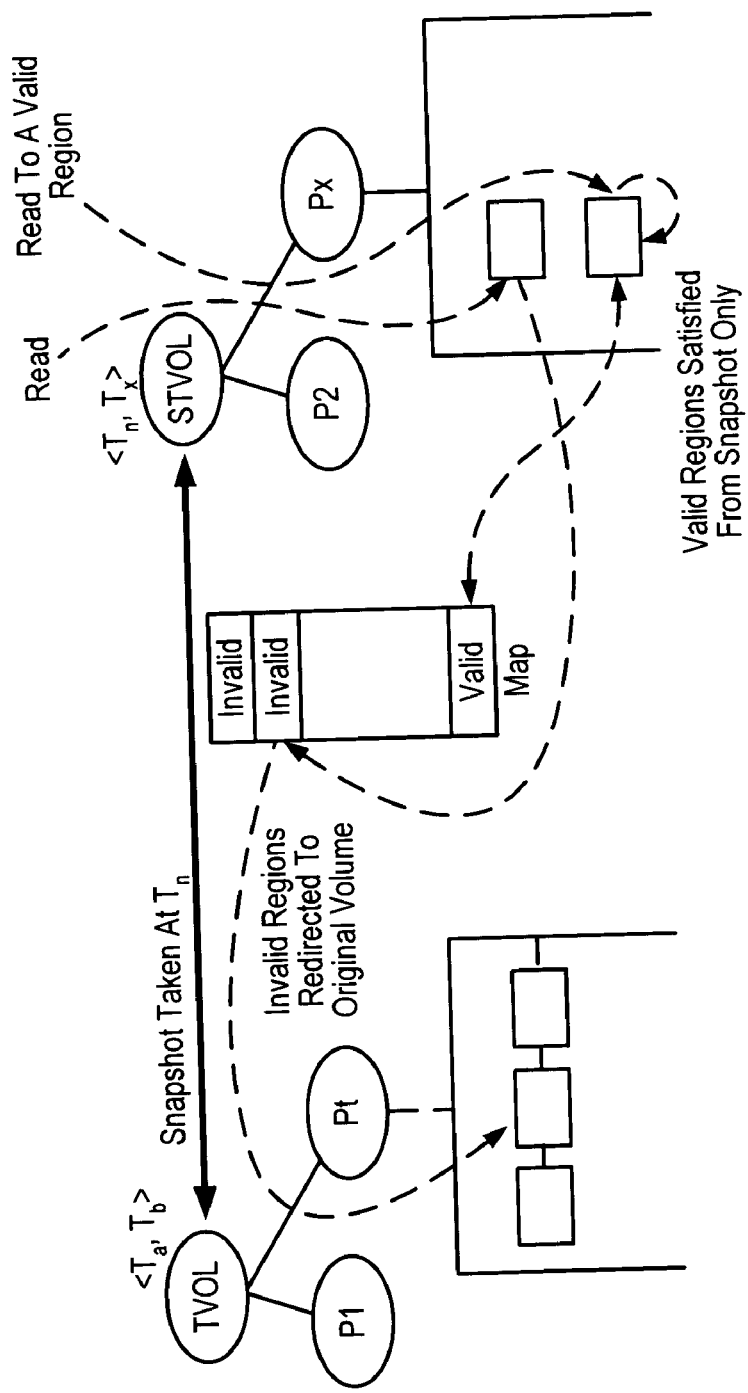
FIG. 12 illustrates deriving a space-optimized temporal snapshot from a temporal volume according to one embodiment.

FIG. 12 illustrates deriving a space-optimized temporal snapshot from a temporal volume according to one embodiment. The original temporal volume is TVOL with a temporal window of $<T_a, T_b>$. When a temporal snapshot STVOL is created at $T_n$, its temporal window becomes $<T_n,T_n>$, with $T_a<=T_n<=T_b$. The snapshot creation operation first creates the plexes ($P_2$, $P_x$, etc.), then the cache object and the snapshot volume STVOL. It then sets all the regions of STVOL as "invalid". In one embodiment, the I/O on STVOL may proceed as follows:

Temporal read on STVOL at time $T_x$, in case the region is:
  Invalid, perform temporal read on TVOL at $T_n$ and return the data. $T_n$ is the time at which the snapshot was created.
  Valid, if $T_x>T_n$, perform temporal read on STVOL at $T_x$, where $T_x$ is the time when the region was modified on STVOL; this will be the latest copy of the region. Otherwise, perform temporal read from TVOL.

Temporal write on STVOL at time $T_x$, in case the region is:
  Invalid, get the old data for the region from TVOL using temporal read at $T_n$, overlay the new data on old data, write to STVOL using temporal write and timestamp of $T_x(T_x>T_n)$. Set the region as valid in the map and change temporal window of STVOL to $<T_n, T_x>$.
  Valid, do a temporal write on STVOL itself with timestamp $T_x$ and change temporal window of STVOL to $<T_n, T_x>$.

Slices are cuts of the original temporal volume for a time period, unlike snapshots which are point-in-time images. So a slice of a temporal volume with temporal window $<T_a, T_b>$, holds a subset of the history from $T_i$ to $T_j$ where $T_i >= T_a$ and $T_j <= T_b$.

In one embodiment, creating a slice of a temporal volume may be similar to creating a snapshot. First the allocation is done, which involves creating the plexes, the cache object and finally the volume STVOL (snapshot temporal volume, or temporal snapshot). Then all the regions in the map are marked as invalid and the temporal window of the slice is set to $<T_i, T_j>$. In one embodiment, the I/O on STVOL may proceed as follows:

Temporal read on STVOL at time $T_x$. If the region is marked as:
  Invalid, perform temporal read on TVOL with timestamp of $T_x$
  MODIFIED, if $T_x>T_j$, perform temporal read on STVOL at $T_x$, where $T_x$ is the time when the region was modified on STVOL; this will be the latest copy of the region. Otherwise, perform temporal read from TVOL.

Temporal write on STVOL at time $T_x$. If the region is marked as:

Invalid, get the old data for the region from TVOL using temporal read at $T_j$, overlay the new data on old data, write to STVOL using temporal write and timestamp of $T_x(T_x>T_j)$. Set the region as valid in the map and change temporal window of STVOL to $<T_j, T_x>$.

Valid, do a temporal write on STVOL itself with timestamp $T_x$ and change temporal window of STVOL to $<T_j, T_x>$.

In one embodiment, since the history of the data on a temporal volume is stored in the volume itself, the volume may return to a state in its past. If the temporal volume (TVOL) has a temporal window of $<T_a, T_b>$ and the user wants to restore the volume to its state at time $T_k$, where $T_a<=T_k<=T_b$, the process may be performed in the following manner in one embodiment:

If the user wants to delete the history:
 Consult the map for TVOL and for every region that is valid, delete all region copies with timestamp $>T_k$ (this basically means returning the data blocks to free pool).

If the user wants to retain the history:
 Consult the map for TVOL and, for every region that is valid, find the offset of region-copy at time $T_k$ (on the cache object); for example, if it's $B_x$, set offset of region-copy at time $T_r$ to $B_x$, where $T_r$ is the time at which the restore was started.

One embodiment may provide a mechanism for the temporal volume to be restored from one of its point-in-time images. The process may be similar to the one described in the previous section. Instead of using the map for TVOL, the map for the snapshot may be used. However, this type of restore may involve data movement because the snapshot may have been modified independently. One embodiment may provide a mechanism for the temporal volume to be restored from one of its slices. The slices may or may not have been modified. The restore may change a part or all of the history and may require complicated data movement.

Exemplary embodiments of interfaces for doing I/O and related operations on a temporal volume have been previously described. The following describes exemplary user-level interfaces that may be useful from an application point of view rather than being generic as those interfaces previously described, and are not intended to be limiting.

If an application wants to continuously keep track of changes to the regions of the volume, the application has to provide timestamps and use the temporal write interface to write to the volume. For applications that are just interested in keeping the history, this may generate a big overhead. The exemplary interfaces described below do not require the user to specify timestamp while writing to the temporal volume (dev name). The following is an exemplary API for writing to a temporal volume that does not require a timestamp:

```
int temporal_sys_write (char         *dev_name,
                        void         *buffer,
                        unsigned int offset,
                        unsigned int length);
```

When reading, the user may specify the timestamp using a time-string (e.g. "Jan. 20, 2003, 2:10 pm"), as illustrated in the following exemplary API for reading from a temporal volume:

```
void temporal_sys_read (char         *dev_name,
                        char         *time_string,
                        unsigned int offset,
                        unsigned int length);
```

For databases, doing I/O on the block may be desired. One embodiment may provide block-level APIs to temporal volumes for use by databases (or other applications). The following exemplary interfaces may be provided as block-level APIs in one embodiment:

```
void temporal_block_read ( char          *dev_name,
                           unsigned int  block_offset);
void temporal_block_period_read ( char   *dev name,
                           timestamp_t   period_start,
                           timestamp_t   period_end,
                           unsigned int  block_offset,
                           unsigned int  *copy_num);
int temporal block write ( char          *dev_name,
                           void          *buffer,
                           timestamp_t   timestamp,
                           unsigned int  block_offset);
int temporal_block_info ( char           *dev_name,
                           unsigned int  block_offset,
                           timestamp_t   *min_timestamp,
                           timestamp_t   *max_timestamp,
                           timestamp_t   **change_timestamps);
```

Although applications may access the temporal features using the interfaces previously described and, in one embodiment, using one or more volume manager libraries (e.g. VxVM libraries), it may happen that the provided interface or APIs are not sufficient and applications want interfaces tuned to their needs. For example, a database may be more interested in block extraction for query processing, file systems may do their business in terms of extents, and repositories may extract whole objects. One embodiment may provide an agent-based framework that may allow applications to write agents that are more specific to the applications' particular needs.

In this document, an agent is a broker that interacts with a temporal volume on an application's behalf and that supports (some or all) semantics of the application. An agent preferably makes it easier for an application to interact with a temporal volume. In addition, an agent may allow an application to extract data in the needed format and not just as raw data. For the temporal volume, this may not make any difference, but for applications, this may be advantageous.

In one embodiment, on the application side, agents may export any interface that is suitable for the application's needs. On the volume side, the agent may use the interfaces that have been provided by the temporal volume infrastructure, for example those previously described. Agents may take the form of libraries, utilities or even scripts. Agents may be written as hooks into the application (like trapping a particular call), or alternatively agents may be tightly integrated into the application. In one embodiment, temporal volumes may provide a standard library and command set, using which agents may be written.

Agents may be used, for example, in existing systems that do not support temporal operations, but that want to support temporal operations using temporal volumes as described herein. The following are some exemplary scenarios where agents may be used.

In a first exemplary scenario, some databases may not support temporal operations or data but may want to use temporal volumes. For these databases, the database may be created and a database agent or agents may be used to re-vector operations that have time dimension associated with them. This way, existing databases that are not temporal may add a database agent layer that serves as an interface to the temporal volume(s) to support temporal operations.

In a second exemplary scenario, repositories may use agents as interfaces to temporal volumes to temporally store and retrieve their data objects. Whenever an object changes, the change request may be rerouted to an object-agent that writes the object to the exact same location in which the old one was. Since this repository is created over a temporal volume, only the blocks that have changed will be versioned. While extracting the object version for a particular timestamp, the object-agent adds the appropriate timestamp to the volume reads, thus returning the past version of the object without degradation in indexing or extraction performance.

In one embodiment, the temporal window parameter and/or the periodic checkpointing facility of a temporal volume, previously described, may be used in performing periodic replication. Periodic replication replicates a set of volumes periodically instead of sending over the changes as they happen. This may have advantages including, but not limited to, reduced I/O latency (as compared to synchronous replication) and log not being necessary (as opposed to asynchronous replication). The temporal window may be set slightly larger than the period of replication; thus, only the changes that happened within the period are stored. Sending only the changes to the regions, instead of whole region copies, may further optimize the replication. These changes may be computed using the latest copy of the data and the copy of the data at the time of last replication (end of last period).

Temporal applications may generate inordinate amount of data that may be required to be retained for an extended period within temporal volumes. Taking older history offline while keeping latest history online may be useful, for example, if the user does not want to lose changes but wants to use the most recent history. In such cases, the temporal window will be "infinite". This will result in having all states of data in the past inside the temporal volume, which may require large amounts of storage. In one embodiment, HSM (Hierarchical Storage Management) may be used to transparently move infrequently accessed data and/or history to other media (e.g., tape or optical devices) while the applications are online.

In one embodiment, temporal volumes may be integrated with backup utilities. Backup utilities may use a delta backup technique to store only the changes made to a file, thereby optimizing the bandwidth required for making a backup. Network backup utilities may store the backups at a central (not necessarily single) backup server, allowing many application clients to share only one instance of backup. Using temporal volumes, the delta preservation may be done automatically at the logical device level, and thus deltas for files need not be computed and stored explicitly. Temporal volumes may also be used in versioning the deltas for multiple clients. If multiple users change a file independently, the versions may be stored inside the same temporal volume, facilitating later extraction of versions of the file.

In one embodiment, the temporal window may allow backup utilities to track changes to a file on client side. A temporal window of one change may be used in tracking changes continuously. Obtaining a delta may be optimized since the original contents need not (necessarily) be fetched from the server, but instead may be retrieved using a temporal read for a previous state of the data. In one embodiment, the delta may be created on the client side.

GLOSSARY

Hierarchical Storage Management (HSM)—a set of software and/or hardware that provides enterprise-wide storage management services such as automatic policy-based data migration, automatic backup, compression, security, and archiving. The feature most common to all HSM solutions is data migration, the ability to off load data to less expensive or near-line storage such as tape, CDs or WORM drives based on data access patterns. HSM transparently recalls such data when it is accessed.

Mirror, Plex—A logical mapping or copy of a volume's data. There may be one or more plexes in a volume. Each individual mirror does not need to have a complete copy but may have holes where the data is not mapped due to some error on the physical media or due to the peculiarities of the mirror's geometry. This may be referred to as a sparse plex. However, there has to be a plex in a volume that is complete.

Original Volume—a volume from which one or more mirrors are being (or have been) split off as a result of snapshot or detach operation.

Replication—The process of maintaining consistency between a data volume on the primary site and its image on a geographically distant secondary site. There are three modes or replication: synchronous, asynchronous and periodic. Synchronous replication returns the write only when the secondary has also been updated. Asynchronous replication logs the changes in a log, immediately returns the write and updates the secondary later on (in background). Periodic replication transfers the incremental changes to the secondary site to maintain the consistency.

Restore—A Volume Manager operation in which an original volume after a logical corruption gets back one of its earlier point-in-time images.

Resync, Resynchronization—A Volume Manager operation that either puts a stale plex in synchronization with the contents of volume or (with instant snapshots) a volume in synchronization with another volume.

Snapshot Volume—A point-in-time image of an original volume.

Snapshot—A Volume Manager operation that creates a snapshot volume.

Volume—A Volume Manager pseudo device that behaves like a physical block storage device (disk) but may have an arbitrarily complex and possibly redundant internal geometry. A volume ultimately maps its logical space to the physical space on real disk drives (although what the Volume Manager sees as a physical disk may in turn be a pseudo device created by another driver or by a storage array).

VxFS—VERITAS File System, a journaling file system that preserves the intents of or operations done on the files there by allowing rollbacks and redos. VxFS also allows cloning, which is equivalent of taking a point in time image of the file-system.

Checkpointing—A process of taking a logical point-in-time image of the data volume.

Invalid region—A region of the data volume that has never been written by the application and hence does not contain any valid application data.

Valid region—A region of the data volume that contains the data that is valid for application.

Conclusion

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer implemented system, comprising:
   one or more processing devices configured to implement:
      an application;
      a temporal volume configured to store temporal data; and
      a temporal volume manager configured to:
         receive an I/O request from the application, wherein the I/O request specifies one or more timestamps for temporal data on the temporal volume; and
         perform a logical device-level temporal operation on the temporal volume in response to the I/O request;
         wherein in said temporal operation, the temporal volume manger is configured to perform one or more of:
            return temporal data to the application;
            modify data on the temporal volume; and
            generate a checkpoint of temporal data on the temporal volume.

2. The system as recited in claim 1, wherein the I/O request is a write request, and wherein, in said temporal operation, the temporal volume manager is further configured to write temporal data specified by the I/O request to the temporal volume.

3. The system as recited in claim 2, wherein, in said temporal operation, the temporal volume manager is further configured to generate a checkpoint of the temporal data on the temporal volume corresponding to a timestamp specified by the I/O request.

4. The system as recited in claim 1, wherein the I/O request is a read request, and wherein, in said temporal operation, the temporal volume manager is further configured to return temporal data specified by the I/O request to the application.

5. The system as recited in claim 1, wherein the I/O request specifies that a checkpoint of the temporal volume is to be created corresponding to a timestamp specified by the I/O request, and wherein, in said temporal operation, the temporal volume manager is further configured to generate the checkpoint of the temporal volume corresponding to the specified timestamp.

6. The system as recited in claim 1, wherein the temporal volume manager is further configured to generate checkpoints of the temporal volume at a time interval specified by an I/O request.

7. The system as recited in claim 1, wherein the I/O request specifies that a point-in-time image of the temporal volume is to be created corresponding to a timestamp specified by the I/O request, and wherein, in said temporal operation, the temporal volume manager is further configured to generate the point-in-time image of the temporal volume corresponding to the specified timestamp.

8. The system as recited in claim 1, wherein the I/O request specifies that a slice-in-time image of the temporal volume specified by two timestamps in the I/O request is to be created, and wherein, in said temporal operation, the temporal volume manager is further configured to generate the slice-in-time image of the temporal volume specified by the two timestamps.

9. The system as recited in claim 1, wherein the I/O request specifies that a history of the temporal volume is to be truncated at a point in time specified by the I/O request, and wherein, in said temporal operation, the temporal volume manager is further configured to truncate the history of the temporal volume at the point in time specified by the I/O request.

10. The system as recited in claim 1, wherein the I/O request specifies that a history of the temporal volume is to be traversed to a point in time specified by the I/O request, and wherein the temporal volume manager is further configured to perform the temporal operation at the point in time in the history of the temporal volume specified by the I/O request.

11. The system as recited in claim 1, wherein the I/O request indicates one or more regions of the temporal volume on which the temporal operation is to be performed.

12. A computer implemented system, comprising:
   means for receiving an I/O request for a temporal volume from an application, wherein the I/O request specifies one or more timestamps for temporal data on a temporal volume; and
   means for performing a logical device-level temporal operation on the temporal volume in response to the I/O request;
   wherein the means for performing the temporal operation comprises one or more of:
      means for returning temporal data from the temporal volume to the application;
      means for modifying data on the temporal volume; and
      generating a checkpoint of temporal data on the temporal volume.

13. A computer-implemented method, comprising:
   a temporal volume manager receiving an I/O request from an application, wherein the I/O request specifies one or more timestamps for temporal data on a temporal volume; and
   the temporal volume manager performing a logical device-level temporal operation on the temporal volume in response to the I/O request;
   wherein performing the temporal operation comprises one or more of:
      the temporal volume manager returning temporal data from the temporal volume to the application;

the temporal volume manager modifying data on the temporal volume; and the temporal volume manager generating a checkpoint of temporal data on the volume.

14. The method as recited in claim 13, wherein the I/O request is a write request, and wherein said performing a logical device-level temporal operation on the temporal volume comprises the temporal volume manager writing temporal data specified by the I/O request to the temporal volume.

15. The method as recited in claim 14, wherein said performing a logical device-level temporal operation on the temporal volume further comprises generating a checkpoint of the temporal data on the temporal volume corresponding to a timestamp specified by the I/O request.

16. The method as recited in claim 13, wherein the I/O request is a read request, and wherein said performing a logical device-level temporal operation on the temporal volume comprises returning temporal data specified by the I/O request to the application.

17. The method as recited in claim 13, wherein the I/O request specifies that a checkpoint of the temporal volume is to be created corresponding to a timestamp specified by the I/O request, and wherein said performing a logical device-level temporal operation on the temporal volume comprises generating the checkpoint of the temporal volume corresponding to the specified timestamp.

18. The method as recited in claim 13, further comprising the temporal volume manager generating checkpoints of the temporal volume at a time interval specified by an I/O request.

19. The method as recited in claim 13, wherein the I/O request specifies that a point-in-time image of the temporal volume is to be created corresponding to a timestamp specified by the I/O request, and wherein said performing a logical device-level temporal operation on the temporal volume comprises generating the point-in-time image of the temporal volume corresponding to the specified timestamp.

20. The method as recited in claim 13, wherein the I/O request specifies that a slice-in-time image of the temporal volume specified by two timestamps in the I/O request is to be created, and wherein said performing a logical device-level temporal operation on the temporal volume comprises generating the slice-in-time image of the temporal volume specified by the two timestamps.

21. The method as recited in claim 13, wherein the I/O request specifies that a history of the temporal volume is to be truncated at a point in time specified by the I/O request, and wherein said performing a logical device-level temporal operation on the temporal volume comprises truncating the history of the temporal volume at the point in time specified by the I/O request.

22. The method as recited in claim 13, wherein the I/O request specifies that a history of the temporal volume is to be traversed to a point in time specified by the I/O request, and wherein said performing a logical device-level temporal operation on the temporal volume comprises performing the temporal operation at the point in time in the history of the temporal volume specified by the I/O request.

23. The method as recited in claim 13, further comprising performing the logical device-level temporal operation on one or more regions of the temporal volume indicated by the I/O request.

24. A computer-readable storage medium comprising program instructions, wherein the program instructions are configured to implement:

a temporal volume manager receiving an I/O request from an application, wherein the I/O request specifies one or more timestamps for temporal data on a temporal volume; and the temporal volume manager performing a logical device-level temporal operation on the temporal volume in response to the I/O request;

wherein performing the temporal operation, the program instructions are configured to implement one or more of:

the temporal volume manager returning temporal data from the temporal volume to the application;

the temporal volume manager modifying data on the temporal volume; and the temporal volume manager generating a checkpoint on the.

25. The computer-readable storage medium as recited in claim 24, wherein the I/O request is a write request, and wherein, in said performing a logical device-level temporal operation on the temporal volume, the program instructions are further configured to implement the temporal volume manager writing temporal data specified by the I/O request to the temporal volume.

26. The computer-readable storage medium as recited in claim 25, wherein, in said performing a logical device-level temporal operation on the temporal volume, the program instructions are further configured to implement generating a checkpoint of the temporal data on the temporal volume corresponding to a timestamp specified by the I/O request.

27. The computer-readable storage medium as recited in claim 24, wherein the I/O request is a read request, and wherein, in said performing a logical device-level temporal operation on the temporal volume, the program instructions are further configured to implement returning temporal data specified by the I/O request to the application.

28. The computer-readable storage medium as recited in claim 24, wherein the I/O request specifies that a checkpoint of the temporal volume is to be created corresponding to a timestamp specified by the I/O request, and wherein, in said performing a logical device-level temporal operation on the temporal volume, the program instructions are further configured to implement generating the checkpoint of the temporal volume corresponding to the specified timestamp.

29. The computer-readable storage medium as recited in claim 24, wherein the program instructions are further configured to implement the temporal volume manager generating checkpoints of the temporal volume at a time interval specified by an I/O request.

30. The computer-readable storage medium as recited in claim 24, wherein the I/O request specifies that a point-in-time image of the temporal volume is to be created corresponding to a timestamp specified by the I/O request, and wherein, in said performing a logical device-level temporal operation on the temporal volume, the program instructions are further configured to implement generating the point-in-time image of the temporal volume corresponding to the specified timestamp.

31. The computer-readable storage medium as recited in claim 24, wherein the I/O request specifies that a slice-in-time image of the temporal volume specified by two timestamps in the I/O request is to be created, and wherein, in said performing a logical device-level temporal operation on the temporal volume, the program instructions are further configured to implement generating the slice-in-time image of the temporal volume specified by the two timestamps.

32. The computer-readable storage medium as recited in claim 24, wherein the I/O request specifies that a history of the temporal volume is to be truncated at a point in time specified by the I/O request, and wherein, in said performing a logical device-level temporal operation on the temporal volume, the program instructions are further configured to implement truncating the history of the temporal volume at the point in time specified by the I/O request.

33. The computer-readable storage medium as recited in claim 24, wherein the I/O request specifies that a history of the temporal volume is to be traversed to a point in time specified by the I/O request, and wherein, in said performing a logical device-level temporal operation on the temporal volume, the program instructions are further configured to implement performing the temporal operation at the point in time in the history of the temporal volume specified by the I/O request.

34. The computer-readable storage medium as recited in claim 24, wherein the program instructions are further configured to implement performing the logical device-level temporal operation on one or more regions of the temporal volume indicated by the I/O request.

* * * * *